H. HARDISTY.
NUT LOCKING DEVICE.
APPLICATION FILED NOV. 17, 1914.
1,141,334. Patented June 1, 1915.
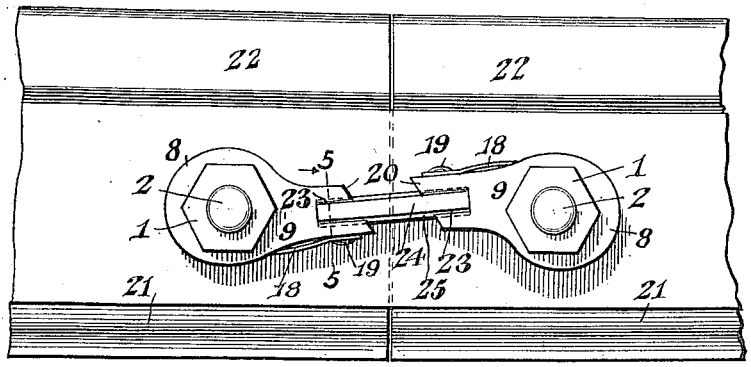
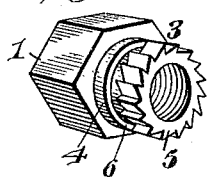
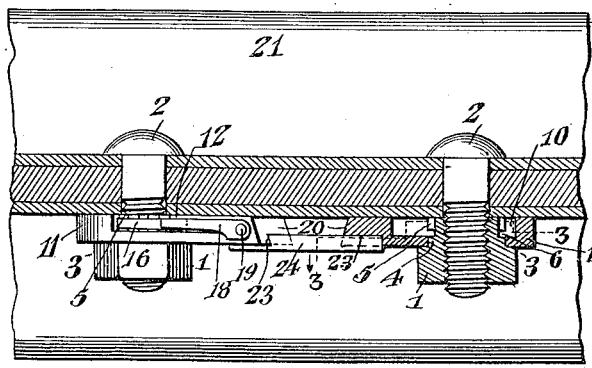
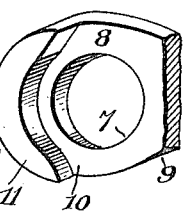
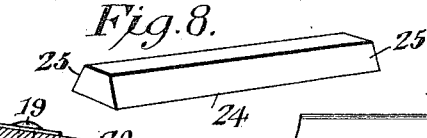
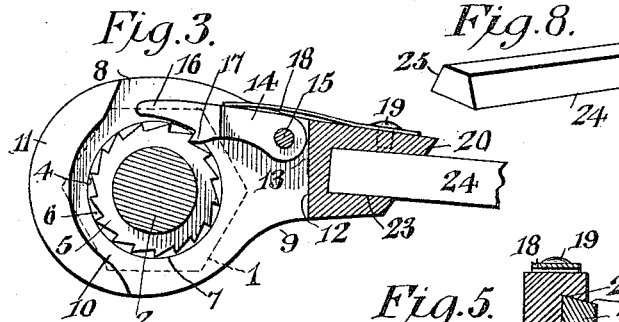
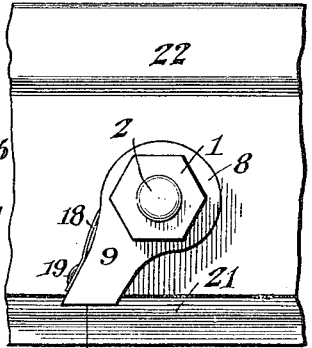
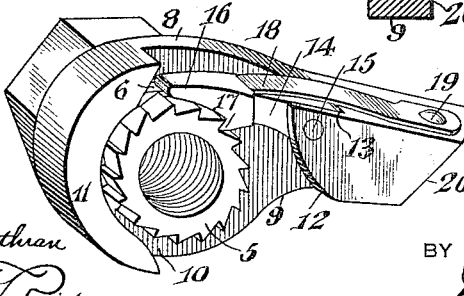
Henry Hardisty, INVENTOR
WITNESSES
BY
ATTORNEY

UNITED STATES PATENT OFFICE.

HENRY HARDISTY, OF RAYMOND, WASHINGTON, ASSIGNOR OF ONE-HALF TO ELIAS PIERSON, OF SOUTH BEND, WASHINGTON.

NUT-LOCKING DEVICE.

1,141,334.  Specification of Letters Patent.  Patented June 1, 1915.

Application filed November 17, 1914. Serial No. 872,570.

*To all whom it may concern:*

Be it known that I, HENRY HARDISTY, a citizen of the United States, residing at Raymond, in the county of Pacific and State of Washington, have invented a new and useful Nut-Locking Device, of which the following is a specification.

This invention relates to improvements in nut locking devices.

The object of the present invention is to improve the construction of nut locking devices and to provide a simple, practical, and comparatively inexpensive nut lock of strong and durable construction, designed for use on rail joints and various other places and adapted particularly for locking a pair of nuts.

A further object of the invention is to provide a nut locking device of this character equipped with means for enabling it to be varied in length to adapt it for use on bolts arranged different distances apart.

With these and other objects in view the invention consists in the construction and novel combination of parts hereinafter fully described, illustrated in the accompanying drawing, and pointed out in the claims hereto, it being understood that various changes in the form, proportion, size and minor details of construction, within the scope of the claims, may be resorted to without departing from the spirit or sacrificing any of the advantages of the invention.

In the drawing:—Figure 1 is a side elevation of a portion of a rail joint equipped with a nut lock constructed in accordance with this invention and shown applied to a pair of bolts. Fig. 2 is a horizontal sectional view of the same. Fig. 3 is a vertical sectional view on the line 3—3 of Fig. 2. Fig. 4 is a perspective view of one of the nut locks. Fig. 5 is a detail sectional view on the line 5—5 of Fig. 1. Fig. 6 is a detail perspective view of one of the nuts. Fig. 7 is a detail perspective view of the head portion of one of the arms or members. Fig. 8 is a detail perspective view of the dovetail connecting bar. Fig. 9 is a side elevation of a portion of a rail joint equipped with a single nut lock.

Like numerals of reference designate corresponding parts in all the figures of the drawing.

In the accompanying drawing, in which is illustrated the preferred embodiment of the invention, 1 designates a nut designed to be of hexagonal or other polygonal form and adapted to be arranged on a bolt 2 of the ordinary construction. The nut 1 is provided at its inner or rear face with a tubular extension 3, having a smooth inner bearing portion 4 and a terminal ratchet portion 5, preferably spaced from the bearing portion 4 by an intervening annular groove 6. The terminal ratchet portion consists of an annular series of teeth having their outer edges arranged in alinement with the periphery of the inner bearing portion to enable the said terminal ratchet portion to pass through a bearing opening 7 of a size to fit the inner bearing portion 4 of the tubular extension 3. The bearing opening 7 is formed in a head 8 at one end of an arm or member 9, recessed or reduced at 10 at the inner face of the head to receive the terminal ratchet portion 5 of the nut. The recess 10, which terminates short of the adjacent end of the arm, forms an outer guard flange 11 substantially concentric with the bearing opening and extending partially around the terminal ratchet portion 5 of the nut, as clearly illustrated in Fig. 4 of the drawing.

The inner wall or shoulder 12 of the recess 10 is recessed or bifurcated at 13 to receive one end of a pawl or dog 14, pivoted in the recess or bifurcation 13 by a transverse pin or rivet 15, and provided with a free outer portion 16 arranged upon the terminal ratchet portion 5 of the nut and provided at the lower side with a tooth 17 for engaging the same, whereby the nut is positively locked against retrograde rotation. The pawl or dog is maintained in engagement with the ratchet teeth of the nut by a spring 18, secured at one end to the arm or member 9 at the upper edge thereof by a rivet 19 or other suitable fastening device, and having its other end free and bearing against the upper edge or face of the pawl or dog. The nut, which has its tubular portion extending through the arm or member 9, retains the latter on the bolt 2. The nut is adapted to be readily tightened, as the pawl and ratchet will permit a free forward rotary movement of the nut. Also, the nut may be readily unscrewed by holding the pawl out of engagement with the ratchet teeth. This may be easily effected by turning the spring on the pin or rivet and then swinging the pawl or dog upwardly and rearwardly.

The arm or member 9 has its end 20 beveled as shown to enable it, when in a downwardly inclined position, as illustrated in Fig. 9 of the drawing, to rest upon the bottom flange 21 of a rail 22, whereby it is maintained in a relatively fixed position in locking the nut against backward movement. When arranged in this manner the nut lock is adapted for use on a single bolt. In order to adapt the nut lock for use in connection with a pair of bolts, the arm or member 9 is provided with a longitudinal dovetail groove 23 extending inwardly from the beveled end 20 and adapted to receive a dovetail connecting bar 24, having beveled side faces 25 which fit the inclined or undercut side walls 26 of the dovetail grooves 23. The bar 24 is adapted to adjustably connect a pair of nut locks and it enables the ratchet nuts thereof to be arranged different distances apart, the dovetail grooves of a pair of nut locks providing a sliding connection between them and the connecting bar. Also, connecting bars of different length may be employed to afford a wide range of adjustment to adapt the nut locking device for use in connection with bolts arranged various distances apart. The nut locking device is adapted to be readily applied to a bolt, and it may be advantageously employed on rail joints, machinery and various other structures subject to vibration.

What is claimed is:—

1. A nut locking device including a nut provided with a tubular extension having a smooth inner bearing portion and an outer ratchet portion, an arm or member provided with a bearing opening into which the said smooth bearing portion extends, the ratchet portion being of substantially the same diameter as the bearing portion so as to pass through the bearing opening of the arm or member, said arm or member being reduced at the bearing opening to form an outer guard or flange and an inner shoulder, a pawl or dog pivoted at the inner shoulder and engaging the ratchet portion of the nut, and a spring pivoted to the arm and normally engaging the pawl for urging the same toward the said ratchet portion, said spring being adapted to be turned on its pivot to release the pawl or dog and permit the same to be swung out of engagement with the ratchet portion of the nut to allow free rotary movement of the latter.

2. A nut locking device including spaced nuts having ratchet and bearing portions, arms or members provided at one end with openings receiving the bearing portions of the nuts, and a bar adjustably and detachably connecting the other ends of the arms or members.

3. A nut locking device including spaced nuts having ratchet and bearing portions, arms or members provided at one end with openings receiving the bearing portions of the nuts, said arms or members being provided at their other ends with grooves, and a connecting bar slidably interlocked with the grooves of the arms or members and forming an adjustable connection between the same.

In testimony, that I claim the foregoing as my own, I have hereto affixed my signature in the presence of two witnesses.

HENRY HARDISTY.

Witnesses:
R. M. HEDDEN,
EVA M. REAM.